Dec. 29, 1931.    W. K. HAWKS    1,838,396
MEASURING VALVE
Filed Nov. 2, 1929
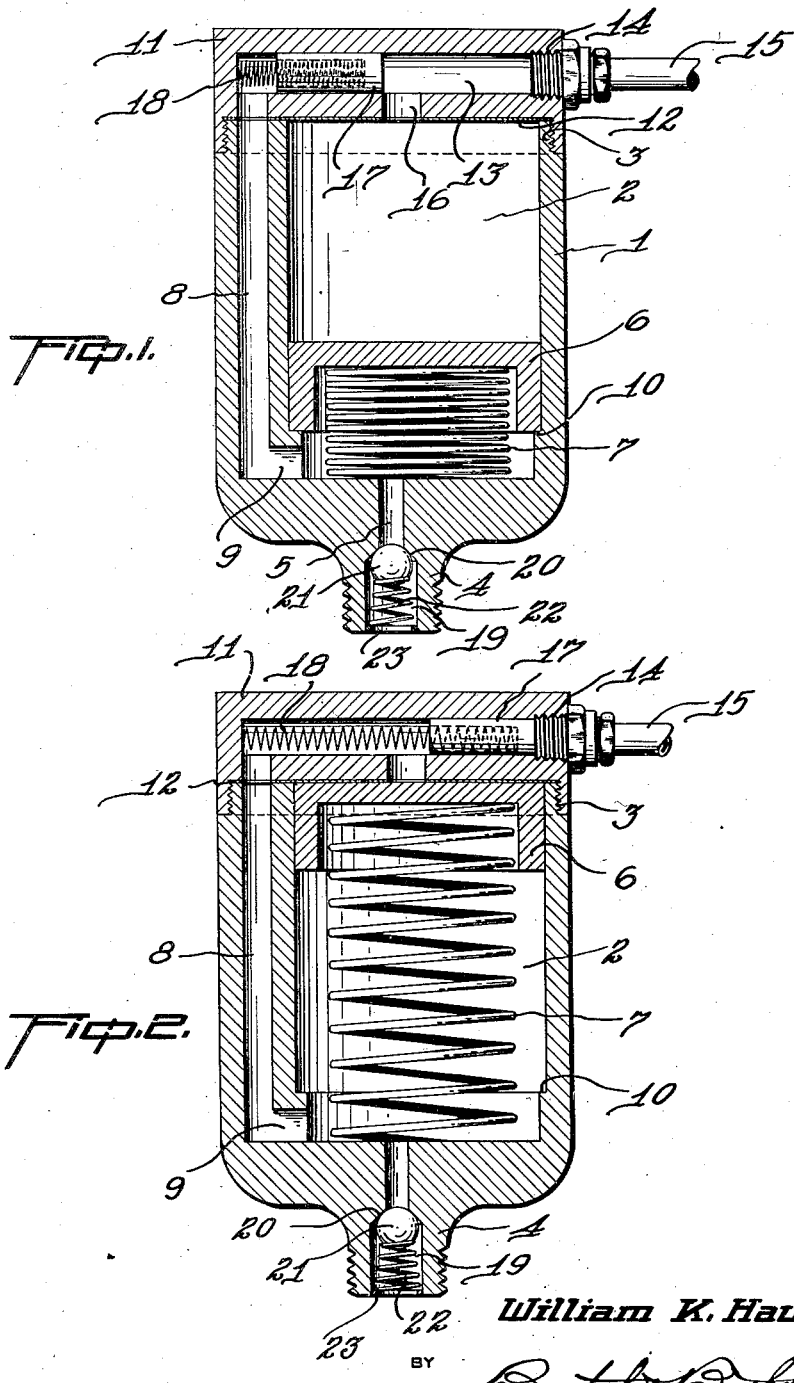
INVENTOR
*William K. Hawks*
BY
ATTORNEYS Patented Dec. 29, 1931

1,838,396

UNITED STATES PATENT OFFICE

WILLIAM K. HAWKS, OF BATTLE CREEK, MICHIGAN, ASSIGNOR TO LUBRICATION DEVICES, INCORPORATED, OF BATTLE CREEK, MICHIGAN, A CORPORATION OF MICHIGAN

MEASURING VALVE

Application filed November 2, 1929. Serial No. 404,272.

The present invention pertains to a novel measuring valve designed particularly for use in centralized lubricating systems.

The principal object of the invention is to provide a simple and effective valve of this character which fills and discharges under pressure from a single source, namely pressure exerted upon the fluid in the reservoir which feeds the valve. The valve includes a valve body with a chamber having a spring pressed piston therein and a valve controlled passage communicating with the chamber at both sides of the piston. The valve is so constructed that, on relief of fluid pressure, the valve in the passage moves to a position which permits the spring pressed piston to transfer fluid from one side of the piston to the other, while on application of pressure the piston is moved against its spring and caused to discharge the fluid contents of the chamber.

The invention is fully disclosed by way of example in the following description and in the accompanying drawings in which—

Figure 1 is a sectional view of the valve showing the position of parts at the end of the discharge stroke; and Fig. 2 is a similar section showing the position of parts at the end of the relief stroke.

Reference to these views will now be had by use of like characters which are employed to designate corresponding parts throughout.

The valve is shown as comprising a casing 1 of substantially cylindrical formation and formed with a filling chamber 2. One end of the casing is open and threaded as at 3, while the other end is reduced to a nipple 4 for connection to a bearing or other member to receive a measured quantity of fluid. The casing is further formed with a discharge port 5 extending from the chamber 2 to the nipple. In the chamber is slidably mounted a piston 6 beneath which is a spring 7 bearing on the base or closed end of the casing. The casing is further formed with a channel 8 alongside the chamber and having one end 9 communicating with the chamber at the spring pressed side of the piston. At this end, the chamber is formed with a valve seat 10 for the piston.

The valve body is completed by a cap 11 screwed on the upper end 3 of the casing, with a gasket 12 interposed between the two parts. The channel 8 is continued as at 13 through the cap 11, the continuation 13 having an exposed end 14 suitably connected to a fluid supply pipe 15. This pipe communicates with a source of fluid supply having means for creating a pressure thereon, such as a reservoir with a piston therein. Inasmuch as such a device is well known in the art, illustration has not been deemed necessary.

The base of the cap is formed with a transfer port 16 communicating with the chamber 2 at the side of the piston opposite that exposed to the end 9 of the passage. In the continuation 13 of the passage 8 is slidably mounted a piston valve 17 so dimensioned that it is receivable at either side of the port 16 whereby to close this port either to the end 9 as in Fig. 1 or to the supply end 14 as in Fig. 2. The valve tends to move to the latter position under the action of a spring 18 inserted between the valve and the blind end of the continuation 13, while the spring 7 tends to move the piston 6 towards the transfer port 16 as also shown in Fig. 2.

The discharge port 5 is enlarged as at 19 towards the outlet end of the nipple, whereby a valve seat 20 is formed. A ball valve 21 is provided to close against the seat and is mounted on a spring 22 which in turn rests on a ring 23 fitted in the nipple, so that the check valve tends to close towards the chamber 2.

The operation of the device will now be described. When fluid is supplied under pressure through the pipe 15 and to the passage continuation 13, the valve 17 is moved against the action of its spring 18 to the position where it permits communication between the supply end 14 and the port 16 and obstructs communication between the port and the other end 9 of the passage. The spring serves as a stop for the valve as clearly illustrated in Fig. 1. Fluid under pressure, therefore, enters the chamber 2 and moves the piston 6 against the action of the spring 7 to the valve seat 10. The purpose of the valve seat is to prevent seepage around the piston from entering the discharge port 5. If the chamber were previously filled with fluid, the fluid would be expelled by the piston through the discharge port and past the check valve.

When pressure on the fluid supply is relieved, the valve 17 is returned by its spring 18 to the other position wherein it closes the port 16 to the supply end 14 and opens the port 16 to the passages 8 and 9 to the chamber at the spring pressed side of the piston, as shown in Figure 2. The piston 6 is moved by its spring 7 towards the transfer port 16, whereupon the fluid in the chamber above the piston is transferred through the port 16 and the passages 8 and 9 back to the chamber but at the lower or spring pressed side of the piston. On the next application of pressure upon the fluid supply, the valve 17 is moved to the position shown in Fig. 1 and the fluid in the chamber at the spring pressed side of the piston is expelled through the discharge port. The valve spring 22 is so light as to require but little pressure upon the piston to open the valve 21, while the spring 18 is of a pressure less than the difference in pressures on the ends of the valve 17 on the pressure or discharge stroke, it being understood that during this stroke the pressure on the spring pressed side of the piston is less than the pressure on the other side, due to the relief which is provided by the opening of the check valve.

Although a specific embodiment of the invention has been illustrated and described, it will be apparent that various alterations in the details of construction may be made without departing from the scope of the invention as indicated by the appended claims.

What I claim is:—

1. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston and a discharge port leading from said chamber at the first named side of said piston, a valve in said passage adapted to alternately occupy positions at opposite sides of said transfer port and to alternatively close said transfer port to the respective ends of said passage, and means tending to move said valve to the position wherein it closes said transfer port to the supply end of said passage.

2. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston and a discharge port leading from said chamber at the first named side of said piston, a spring tending to move said piston towards said transfer port, a valve in said passage adapted to alternatively occupy positions at opposite sides of said transfer port and to alternatively close said transfer port to the respective ends of said passage, and means tending to move said valve to the position wherein it closes said transfer port to the supply end of said passage.

3. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston, and a discharge port leading from said chamber at the first named side of said piston, a valve in said passage adapted to alternatively occupy positions at opposite sides of said transfer port and to alternatively close said transfer port to the respective ends of said passage, and a spring tending to move said valve to the position wherein it closes said transfer port to the supply end of said passage.

4. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston, and a discharge port leading from said chamber at the first named side of said piston, a spring tending to move said piston towards said transfer port, a valve in said passage adapted to alternatively occupy positions at opposite sides of said transfer port and to alternatively close said transfer port to the respective ends of said passage, and a spring tending to move said valve to the position wherein it closes said transfer port to the supply end of said passage.

5. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston, and a discharge port leading from said chamber at the first named side of said piston, a valve seat for said piston formed in said chamber at the communicating end of said passage, a valve in said passage adapted to alternatively occupy positions at opposite sides of said transfer port and to alternatively close said transfer port to the respective ends of said passage, and means tending to move said valve to the position wherein it closes said transfer port to the supply end of said passage.

6. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston, and a discharge port leading from said chamber at the first named side of said piston, a valve seat for said piston formed in said chamber at the communicating end of said passage, a spring tending to move said piston towards said transfer port, a valve in said passage adapted to alternatively occupy positions at opposite sides of said transfer port and to alternatively close said transfer port to the respective ends of said passage, and a spring tending to move said valve to the position wherein it closes said transfer port to the supply end of said passage.

7. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston, and a discharge port leading from said chamber at the first named side of said piston, a check valve in said discharge port closing toward said chamber, a valve in said passage adapted to alternatively occupy positions at opposite sides of said transfer port and to alternatively close said transfer port to the respective ends of said passage, and means tending to move said valve to the position wherein it closes said transfer port to the supply end of said passage.

8. A measuring valve comprising a body formed with a filling chamber, a piston slidable in said chamber, said body having a passage with one end communicating with said chamber at one side of said piston and the other end adapted for connection to a source of fluid supply, said body having a transfer port connecting said passage between the ends thereof to said chamber at the other side of said piston, and a discharge port leading from said chamber at the first named side of said piston, a valve seat for said piston formed in said chamber at the communicating end of said passage, a spring tending to move said piston towards said transfer port, a check valve in said discharge port closing toward said chamber, a valve in said passage adapted to alternatively occupy positions at opposite sides of said transfer port and to alternatively close said transfer port to the respective ends of said passage, and a spring tending to move said valve to the position wherein it closes said transfer port to the supply end of said passage.

In testimony whereof I affix my signature.

WILLIAM K. HAWKS.